United States Patent
Fenster

(10) Patent No.: US 10,341,095 B2
(45) Date of Patent: Jul. 2, 2019

(54) COMPUTERIZED SYSTEM AND METHOD OF SECRET KEY MANAGEMENT

(71) Applicant: Kaminario Technologies Ltd., Yokne'am Ilit (IL)

(72) Inventor: Yaacov Fenster, Petach Tikvah (IL)

(73) Assignee: Kaminario Technologies Ltd., Yokne'am Ilit (IL)

(*) Notice: Subject to any disclaimer, the term of this patent is extended or adjusted under 35 U.S.C. 154(b) by 358 days.

(21) Appl. No.: 15/040,142

(22) Filed: Feb. 10, 2016

(65) Prior Publication Data

US 2016/0241391 A1    Aug. 18, 2016

Related U.S. Application Data

(60) Provisional application No. 62/115,496, filed on Feb. 12, 2015.

(51) Int. Cl.
*H04L 9/08* (2006.01)

(52) U.S. Cl.
CPC ............ *H04L 9/085* (2013.01); *H04L 9/0816* (2013.01); *H04L 9/0838* (2013.01)

(58) Field of Classification Search
CPC ...... H04L 9/085; H04L 9/0816; H04L 9/0838
See application file for complete search history.

(56) References Cited

U.S. PATENT DOCUMENTS

| | | | |
|---|---|---|---|
| 8,745,415 B2 | 6/2014 | Miller et al. | |
| 8,855,318 B1* | 10/2014 | Patnala | H04L 9/0822 380/277 |
| 2004/0047472 A1* | 3/2004 | Eskicioglu | H04L 9/085 380/277 |
| 2010/0046739 A1 | 2/2010 | Schneider | |
| 2010/0054480 A1* | 3/2010 | Schneider | H04L 9/085 380/283 |
| 2011/0126295 A1* | 5/2011 | Resch | G06F 21/64 726/27 |
| 2013/0272521 A1* | 10/2013 | Kipnis | H04L 9/085 380/44 |
| 2014/0007252 A1 | 1/2014 | Eisen et al. | |
| 2014/0089683 A1* | 3/2014 | Miller | H04L 63/061 713/193 |
| 2014/0089693 A1 | 3/2014 | Miller et al. | |

(Continued)

FOREIGN PATENT DOCUMENTS

| | | |
|---|---|---|
| EP | 1933497 A1 | 6/2008 |
| WO | 2005076518 A1 | 8/2005 |

OTHER PUBLICATIONS

Shamir, A.; How to Share a Secret; Communications of the ACM; 22 (11); pp. 612-613; Apr. 1979.

(Continued)

*Primary Examiner* — Joseph P Hirl
*Assistant Examiner* — Thomas A Gyorfi
(74) *Attorney, Agent, or Firm* — Wiggin and Dana LLP; Gregory S. Rosenblatt; Andrew D. Bochner

(57) ABSTRACT

The presently disclosed subject matter includes a computerized method and system of implementing a secret management scheme. According to the proposed approach, values derived from a secret are not distributed to the participating entities. Instead, each participating entity provides a respective preexisting identifier that is not derived from the secret.

22 Claims, 9 Drawing Sheets

(56) References Cited

U.S. PATENT DOCUMENTS

2016/0044001 A1* 2/2016 Pogorelik ........... H04L 63/0428
713/168
2016/0254909 A1* 9/2016 Garcia Morchon .. H04L 9/0838
380/46

OTHER PUBLICATIONS

Blakeley, G.R.; Safeguarding Cryptographic Keys; Proc. of the National Computer Conference; 48; pp. 313-317; 1979.
Wuu, L-H et al.; Group Key Management based on (2, 2) Secret Sharing; KSII Transactions on Internet and Information Systems; vol. 8, No. 3; pp. 1144-1156; Mar. 2014.

* cited by examiner

COMPUTERIZED SYSTEM AND METHOD OF SECRET KEY MANAGEMENT

CROSS-REFERENCE TO RELATED APPLICATIONS

This application claims the benefit of priority to U.S. Provisional Patent Application No. 62/115,496, entitled "SHARING A SECRET WITHOUT DISCLOSING INFORMATION OR DISTRIBUTING SHARES", filed Feb. 12, 2015, the entire disclosure of which is hereby incorporated by reference herein.

FIELD OF INVENTION

The presently disclosed subject matter relates in general to the field of cryptography.

BACKGROUND

A shared secret is a mechanism in cryptography which allows secure communication and data sharing between two or more entities. Secret sharing is a type of shared secret where the secret is broken into different parts (aka "secret shares") and distributed among participants in a group of entities. The secret can be reconstructed only when a sufficient number of secret shares are obtained and combined together.

One known secret sharing scheme is Shamir secret sharing which involves generating a polynomial f(x) of a degree K−1, where the secret is the constant term $a_0$ of the polynomial, and sharing points of the polynomial to N entities. A subset of K points retrieved from K entities is required for calculating the polynomial and obtaining the secret.

See the following reference which is incorporated herein by reference in its entirety: Adi Shamir "How to share a Secret", Communications of the ACM, November 1979, 22 (11): 612-613, Blakley, G. R. (1979). "Safeguarding cryptographic keys", Proceedings of the National Computer Conference 48: 313-317) For example, Adi Shamir in "How to share a Secret", Communications of the ACM, November 1979, 22 (11): 612-613, Blakley, G. R. (1979). "Safeguarding cryptographic keys", Proceedings of the National Computer Conference 48: 313-317. This

GENERAL DESCRIPTION

The presently disclosed subject matter includes a computerized method and system of implementing a secret management scheme. According to the proposed approach, values derived from a secret (referred to herein as "derived values") are not distributed to the participating entities. Instead, each participating entity provides a respective identifier that is not derived from the secret. The identifiers are used by a central authority to generate the "derived values" that are not distributed to the participating entities but rather stored in a data-storage accessible by a central authority.

In order to share a secret S amongst N entities and require a quorum of at least K entities for reconstructing the secret, a polynomial f(x) of degree K−1 is generated using the shared secret as the coefficient for the $0^{th}$ degree (the constant term $a_0$ of the polynomial). The polynomial is represented by coefficients $A_i$ ($0 \le i \le K$).

Each entity $E_i$ submits a respective unique identifier $X_i$ from which a respective $Y_i$ value is generated using the polynomial with the coefficients $A_i$ ($0 \le i \le K$). The generated $Y_i$ values are stored in a data-storage accessible by the central authority. Reconstruction of the secret is executed by the central authority. In order to reconstruct the secret at least K bi-tuples of ($X_i$, $Y_i$) are required.

In the event it is desired to add a new entity $E_{N+1}$ to the existing pool of entities a new $Y_{N+1}$ can be calculated based on a respective identifier received from the new entity.

In case it is desired to change the value of K, a new polynomial of a degree which equals to the new K value −1 can be generated. In case not all identifiers of all entities are available, K identifiers are retrieved from K participating entities and can be used together with the $Y_i$ values to reconstruct the polynomial. The $X_i$ values of those entities that did not submit their identifiers (referred herein as "non-participating entities") can be calculated using the reconstructed polynomial and respective stored Yi values. Once all $X_i$ values are available, new respective $Y_i$ values can be calculated and stored using the newly generated polynomial. Notably, this process requires interaction only with K entities.

Thus, on the one hand, as essential information (derived values) is available only at the central authority, the central authority has a role in the process of reconstructing the secret. On the other hand, because before reconstruction of the secret, information with respect to the identifiers is available only at the respective participating entities, a quorum of (K) entities is also required for reconstructing the secret. Distribution of the information necessary for reconstructing the secret between the central authority and the different entities makes unlawful reconstruction of the secret more difficult.

In addition, as information regarding secret shares is not required to be transmitted from the central authority to the participating entities, a trusted transmission channel (i.e. transmission channel protected from unlawful access) between the central authority and the entities is not required for this purpose.

As the information (identifier) stored at each entity is meaningless without the corresponding "derived share" that is stored in the central authority, leakage of the information from multiple entities (even more than K entities) does not compromise the secret without the additional information stored at the central authority.

Although in some cases this may be preferable, the entities are not required to store different secret shares generated for different secrets. Rather the entities can use the same identifier with many different secrets.

Thus, according to one aspect of the presently disclosed subject matter there is provided a system comprising: a central authority operatively configured to communicate with a plurality of entities; wherein each entity is assigned with a unique identifier; the central authority is configured to store a deconstructed master secret such that at least a sub-set of K out of N available unique identifiers is needed in order to reconstruct the master key; wherein N is the number of identifiers assigned to the entities in the system.

According to another aspect of the presently disclosed subject matter there is provided a system comprising: a computerized device configured for authorizing execution of a restricted operation, wherein the restricted operation is authorized only if a secret key is available; the computerized device comprising at least one computer processor operatively connected to a computer data storage; the computer processor is configured for reconstructing the secret key to:

receive at least K identifiers out of a group of N identifiers, each identifier uniquely identifying a respective entity; retrieve from the computer data storage for each of the at least K identifiers a respective derived value to obtain K (identifiers, derived value) pairs; wherein the derived values are the product of applying a polynomial of a degree K−1 to the identifiers, where the constant term $a_0$ of the polynomial is the secret key; and reconstruct the polynomial based on the K (identifiers, derived value) pairs; and render the secret key available for enabling execution of the restricted operation.

In addition to the above features, the system according to this aspect of the presently disclosed subject matter can optionally comprise one or more of features (i) to (xiv) below, in any technically possible combination or permutation:

(i). wherein the at least one computer processor is further configured for deconstructing the secret key to: receive the N identifiers; use the polynomial of degree K−1 for generating a respective derived value for each of N received identifiers; store the derived values in the data storage and discard the identifiers, the polynomial and the secret.

(ii). wherein the at least one computer processor is further configured, responsive to obtaining the secret key, to transmit the secret to one or more entities to enable the execution of the restricted operation by the entity.

(iii). wherein the at least one computer processor is configured, responsive to obtaining the secret key, to generate a command instructing to execute the restricted operation.

(iv). wherein the derived values are not shared with the entities.

(v). wherein each identifier is received from a respective entity.

(vi). wherein an entity is a computerized device being capable of performing the restricted operation only if the secret key is available at the computerized device.

(vii). wherein an entity is a person.

(viii). The system further comprises an input device configured for receiving from each entity user input data including a respective identifier.

(ix). wherein the derived values are stored in the data storage together with information enabling to identify a respective entity assigned to each identifier.

(x). wherein the identifiers include a combination of identifiers of various types.

(xi). wherein the identifiers include one or more of the following: biometric data of any kind or a derivative thereof; and password of any kind.

(xii). wherein the at least one computer processor is further configured for adding a new entity to existing N entities, to:

retrieve at least K identifiers from K respective entities; retrieve from the data-storage the respective derived values of the retrieved identifiers; use the at least K identifiers and respective derived values to reconstruct the polynomial; apply the polynomial to the new identifier, identifying the new entity, and obtain a new derived value; and store the derived value in the data-storage.

(xiii). wherein the computer processor is further configured for changing the secret key, to:

retrieve at least K identifiers from K respective entities; generate a new polynomial of a degree K−1, where the constant term $a_0$ of the polynomial is a new secret key; use the new polynomial for generating a respective derived value for each of the at least K identifiers;

in the event that not all N identifiers are available, the at least one processor is configured to:

retrieve from the computer data storage for each of the at least K identifiers a respective derived value to obtain at least K (identifiers, derived value) pairs; use K (identifiers, derived value) pairs to reconstruct the polynomial; use the derived values for calculating the remaining identifiers; apply the new polynomial to the calculated identifiers to obtain respective derived values; and store the derived values in the data-storage.

(xiv). The system is a data-storage system, the entities being N data-storage devices constituting a physical storage space of the data-storage system; the computerized device is configured for managing at least one secret key for enabling execution of one or more restricted operations at the N storage devices.

According to another aspect of the presently disclosed subject matter there is provided a computer implemented method of authorizing execution of a restricted operation, wherein the restricted operation is authorized only if a secret key is available; the computer comprising at least one computer processor operatively connected to a computer data storage; the method comprising operating the computer processor for reconstructing the secret key, comprising:

receiving at least K identifiers out of a group of N identifiers, each identifier uniquely identifying a respective entity; retrieving from the computer data storage for each of the at least K identifiers a respective derived value to obtain K (identifiers, derived value) pairs; wherein the derived values are the product of applying a polynomial of a degree K−1 to the identifiers, where the constant term $a_0$ of the polynomial is the secret key; reconstructing the polynomial based on the K (identifiers, derived value) pairs; and rendering the secret key available for enabling execution of the restricted operation by the computer or by another device.

In addition to the above features, the method according to the above aspect of the presently disclosed subject matter can optionally comprise one or more of features (i) to (xiv) above, in any technically possible combination or permutation:

According to another aspect of the presently disclosed subject matter there is provided a non-transitory program storage device readable by a computer, tangibly embodying computer readable instructions executable by the computer to perform a method of authorizing execution of a restricted operation, wherein the restricted operation is authorized only if a secret key is available; the computer comprising at least one computer processor operatively connected to a computer data storage; the method comprising operating the computer processor for reconstructing the secret key, comprising:

receiving at least K identifiers out of a group of N identifiers, each identifier uniquely identifying a respective entity;

retrieving from the computer data storage for each of the at least K identifiers a respective derived value to obtain K (identifiers, derived value) pairs; wherein the derived values are the product of applying a polynomial of a degree K−1 to the identifiers, where the constant term $a_0$ of the polynomial is the secret key;

reconstructing the polynomial based on the K (identifiers, derived value) pairs; and rendering the secret key available for enabling execution of the restricted operation by the computer or by another device.

In addition to the above features, the data-storage device according to the above aspect aspect of the presently disclosed subject matter can optionally comprise one or more of features (i) to (xiv) above, in any technically possible combination or permutation:

According to another aspect of the presently disclosed subject matter there is provided a data-storage system comprising: a control layer comprising one or more control devices operatively connected to N data-storage devices, the data-storage devices constituting a physical storage space of the data-storage system; wherein at least one of the control devices is configured for managing at least one secret key required for enabling execution of one or more restricted operations at the N storage devices; the at least one control device comprising at least one computer processor operatively connected to a computer data storage; the computer processor is configured for reconstructing the secret key to:

receive at least K identifiers out of a group of N identifiers, each identifier uniquely identifying a respective data-storage device; retrieve from the computer data storage for each of the at least K identifiers a respective derived value to obtain K (identifiers, derived value) pairs; wherein the derived values are the product of applying a polynomial of a degree K−1 to the identifiers, where the constant term $a_0$ of the polynomial is the secret key; and reconstruct the polynomial based on the K (identifiers, derived value) pairs and render the secret key available for enabling execution of the restricted operation.

In addition to the above features, the data-storage system according to the above aspect of the presently disclosed subject matter can optionally comprise one or more of features (i) to (xiv) above, in any technically possible combination or permutation:

According to another aspect of the presently disclosed subject matter there is provided a method of managing at least one secret key in a data-storage system, the key is required for enabling execution of one or more restricted operations at N storage devices; the data-storage system comprising at least one control device operatively connected to the N data-storage devices, the N data-storage devices constituting a physical storage space of the data-storage system; the method comprising operating the at least one control device for reconstructing the secret key, comprising:

receiving at least K identifiers out of a group of N identifiers, each identifier uniquely identifying a respective entity;

retrieving from the computer data storage for each of the at least K identifiers a respective derived value to obtain K (identifiers, derived value) pairs; wherein the derived values are the product of applying a polynomial of a degree K−1 to the identifiers, where the constant term $a_0$ of the polynomial is the secret key; reconstructing the polynomial based on the K (identifiers, derived value) pairs; and rendering the secret key available for enabling execution of the restricted operation by the computer or by another device.

In addition to the above features, the method according to the above aspect of the presently disclosed subject matter can optionally comprise one or more of features (i) to (xiv) above, in any technically possible combination or permutation:

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
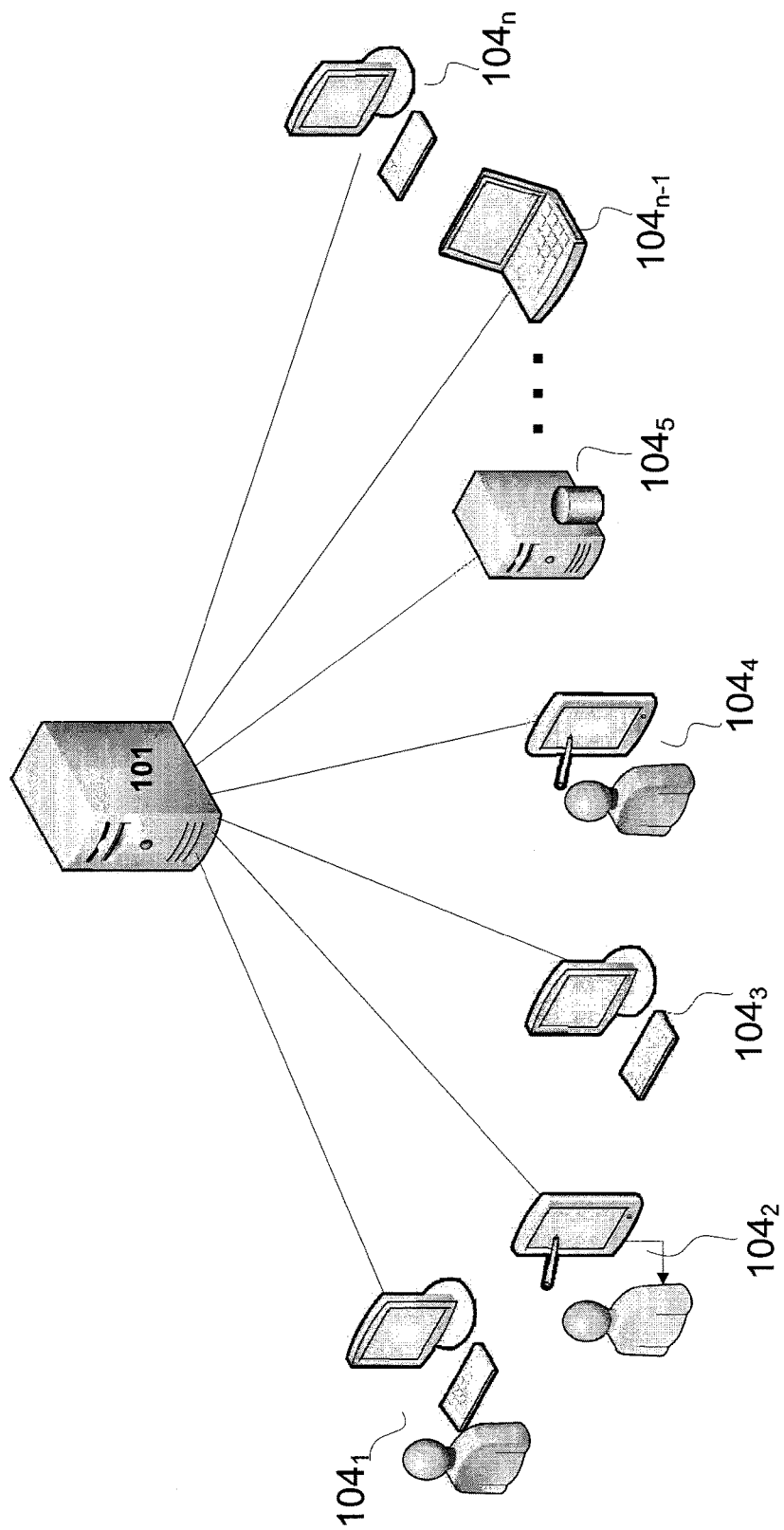
FIG. 1 is a schematic illustration of a general view of a computer system layout comprising central authority connected to a plurality of entities, in accordance with an example of the presently disclosed subject matter.

Unless specifically stated otherwise, as apparent from the following discussions, it is appreciated that throughout the specification discussions utilizing terms such as "receiving", "retrieving", "reconstructing", "deconstructing", "transmitting", "applying" or the like, include actions and/or processes of a computer that manipulate and/or transform data into other data, said data represented as physical quantities, e.g. such as electronic quantities, and/or said data representing the physical objects.

Central authority 101 as well as entity device 330 described below are computerized devices. The terms "computer/computerized device", "computer", "processing unit", "control device" or variations thereof should be expansively construed to cover any kind of electronic device with data processing capabilities, including, by way of non-limiting example (e.g. digital signal processor (DSP), a microcontroller, a field programmable gate array (FPGA), an application specific integrated circuit (ASIC), etc.), or a device comprising a processor and computer memory such as a personal computer, a server, a computing system, a communication device, any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIGS. 4, 5, 6, 7 and 8 may be executed. In embodiments of the presently disclosed subject matter one or more stages illustrated in FIGS. 4, 5, 6, 7 and 8 may be executed in a different order and/or one or more groups of stages may be executed simultaneously. For example, operations described with reference to block 430 can be performed in some example, before or at the same time as operations described with reference to block 425.

FIGS. 1, 2 and 3a, 3b illustrate a general schematic of the system architecture in accordance with an embodiment of the presently disclosed subject matter. Elements in FIGS. 1, 2 and 3a, 3b can be made up of a combination of hardware with firmware and/or with software that performs the functions as defined and explained herein. Elements in FIGS. 1, 2 and 3a, 3b may be centralized in one location or dispersed over more than one location. In other embodiments of the presently disclosed subject matter, the system may comprise fewer, more, and/or different elements than those shown in FIGS. 1, 2 and 3a, 3b.

Bearing this in mind, attention is drawn to FIG. 1 illustrating schematically a general view of a computer system layout comprising a central authority computer device 101 connected to entities $104_{(1-n)}$, according to an example of the presently disclosed subject matter.

Central authority 101 is configured to manage secret keys which are required for providing permission to perform one or more restricted operations, where, only if the secret key is available, permission to perform a restricted operation is granted. Central authority device can be implemented as part of a computerized device or a computer system configured for managing secret, including operations such as: deconstruction and reconstruction of the secret, adding and removing entities and changing secrets. Central authority can be also configured for authorizing execution of a restricted operation.

Entities $104_{(1-n)}$ can be any group of elements where each element is assigned with a unique identifier and is capable to provide the identifier to central authority 101. For example entities $104_{(1-n)}$ can be a group of people or a group of computerized devices which are allowed to perform a certain restricted operation only if K out of N entities are available.

Examples of restricted operations include: access to a certain restricted area (e.g. opening an entrance door or gate to a building or compound or opening a vault), where access is granted only if at least K out of N people provide their respective identifiers; performing a certain operation (e.g. operate a weapon, access a restricted storage area in a computer system, read an encrypted piece of data), where only if at least K out of N people provide their respective identifiers, permission to perform the operation is granted; performing a certain operation by a computer device, where only if at least K out of N computers provide their respective identifiers, permission to perform the operation is granted.

Entities $104_{(1-n)}$ are capable to communicate with the central authority 101 which is accessible for receiving the respective identifiers from entities $104_{(1-n)}$. Communication between central authority 101 and entities $104_{(1-n)}$ can be realized by any suitable communication network (including hardwired and wireless networks) and communication technology, protocol or standard (WiFi, 3G, LTE, etc).

According to one example, central authority 101 comprises or is otherwise operatively connected to one or more user terminals for enabling different entities (e.g. individual people) to interact therewith. User terminals can be configured as an integral part of central authority 101. For example, a user terminal can be configured as a work station or a finger print reader directly connected to the central authority 101 (e.g. a finger print reader located near an entrance door). Alternatively or additionally, user terminals can be implemented as user computerized devices (e.g. Smartphone, laptop computer, PC computer, tablet device, etc.) connected to central authority 101 over a communication network (e.g. the Internet) running for example a user interface (the interface comprising for example, dedicated software, input device and display) configured to allow an individual to provide to the central authority 101 its respective identifier.

Figure 2:
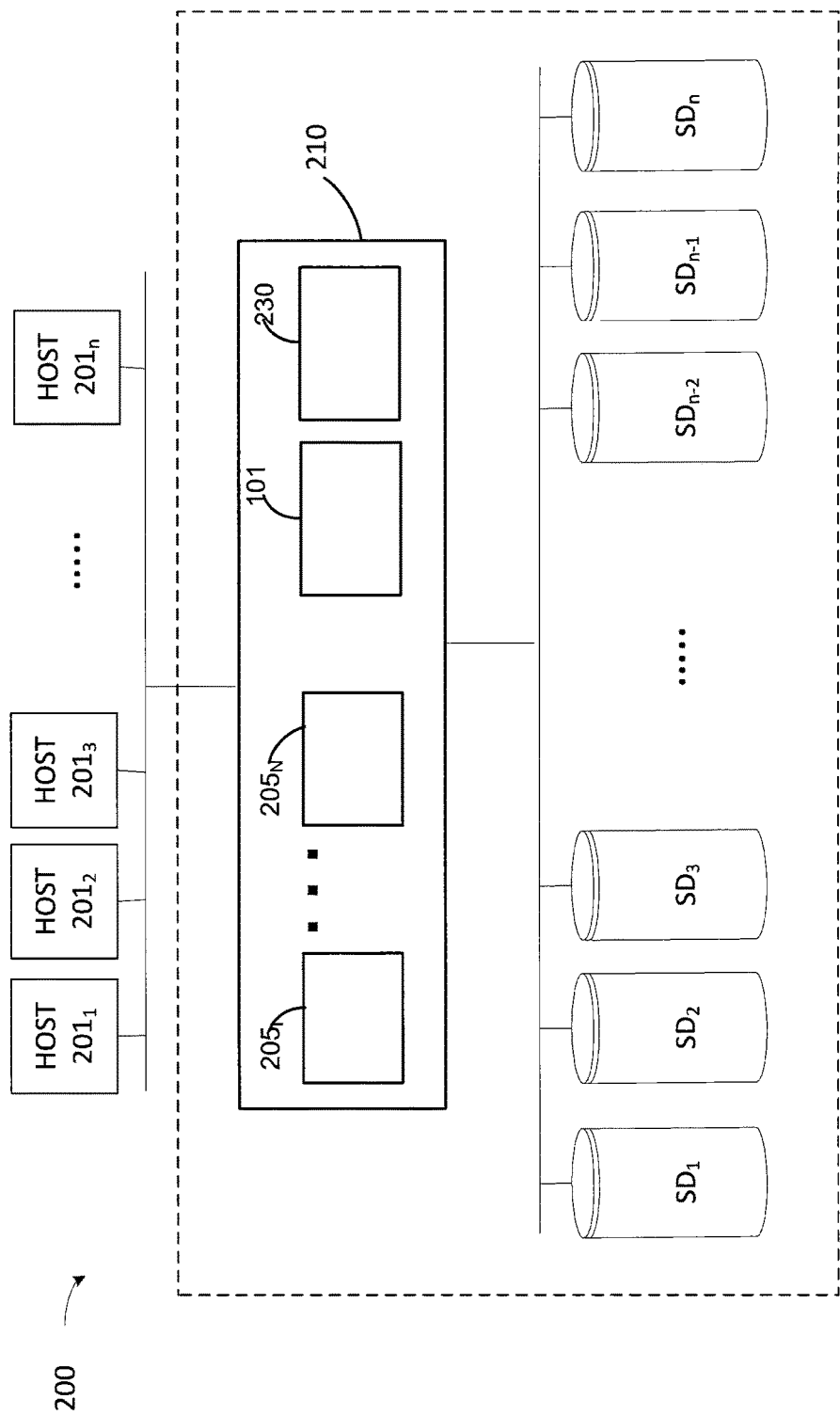
FIG. 2 is a functional block diagram of a data-storage system, in accordance with an example of the presently disclosed subject matter.

As mentioned above, in some examples entities $104_{(1-n)}$ include a group of computerized devices which are allowed to perform a certain operation only if K out of N devices provide their assigned identifier. FIG. 2 illustrates a general functional block diagram of data-storage system (e.g. a highly available data-storage system) implementing secret management, according to the presently disclosed subject matter.

Storage system 200 comprises two or more storage devices $SD_{(1-n)}$ constituting a physical storage space of the storage system. Storage devices may be any one of hard disk storage devices (HDD) or solid state drives (SSD, comprising for example, a plurality of NAND elements) or any other appropriate storage device.

Data-storage system 200 further comprises a control layer 210 comprising one or more control devices $205_{(1-n)}$ (e.g. implemented by server computer devices) operatively connected to the physical storage space and possibly also to one or more $hosts_{(1-n)}$, and configured to control and execute various operations in the storage system (e.g. I/O operations). Control devices $205_{(1-n)}$ in control layer 210 as well as storage devices $SD_{(1-n)}$ constituting the physical storage space can be consolidated in a single unit, or can be otherwise distributed over one or more computer nodes connected across a computer network.

Data-storage system 200 further comprises central authority 101 which can be implemented in various manners. For example, central authority 101 can be implemented as part of one of the control devices $205_{(1-n)}$, be distributed over a plurality of control devices $205_{(1-n)}$, or be implemented as a dedicated control device. Central authority 101 can also be mirrored in at least two control devices to ensure operational persistency. Central authority 101 is operatively connectable to N entities in this case represented by $SD_{(1-n)}$ storage device. According to this example, secret management principles disclosed herein are utilized for reducing the risk of fraudulently accessing the data-storage devices and performing operations unlawfully.

Each storage device is configured to store a unique identifier in a dedicated storage area. Central authority 101 is configured to obtain the identifiers from storage device $SD_{(1-n)}$ and responsive to receiving N unique identifiers from N storage devices, to deconstruct a secret key into K derived values and store the K derived values in a data storage device 230. Data storage device 230 can be configured as part of the control layer or be otherwise operatively connected to central authority 101.

A request to perform a restricted operation (e.g. access any one of the storage devices $SD_{(1-n)}$ for writing or reading) which is received at the central authority 101 is granted only if at least K out of N entities submit their respective identifiers to the central authority 101.

The central authority 101 is configured to use the identifiers, received from at least K entities, together with the stored derived values in order to reconstruct the secret and make it available for performing the restricted operation.

Figure 3A:
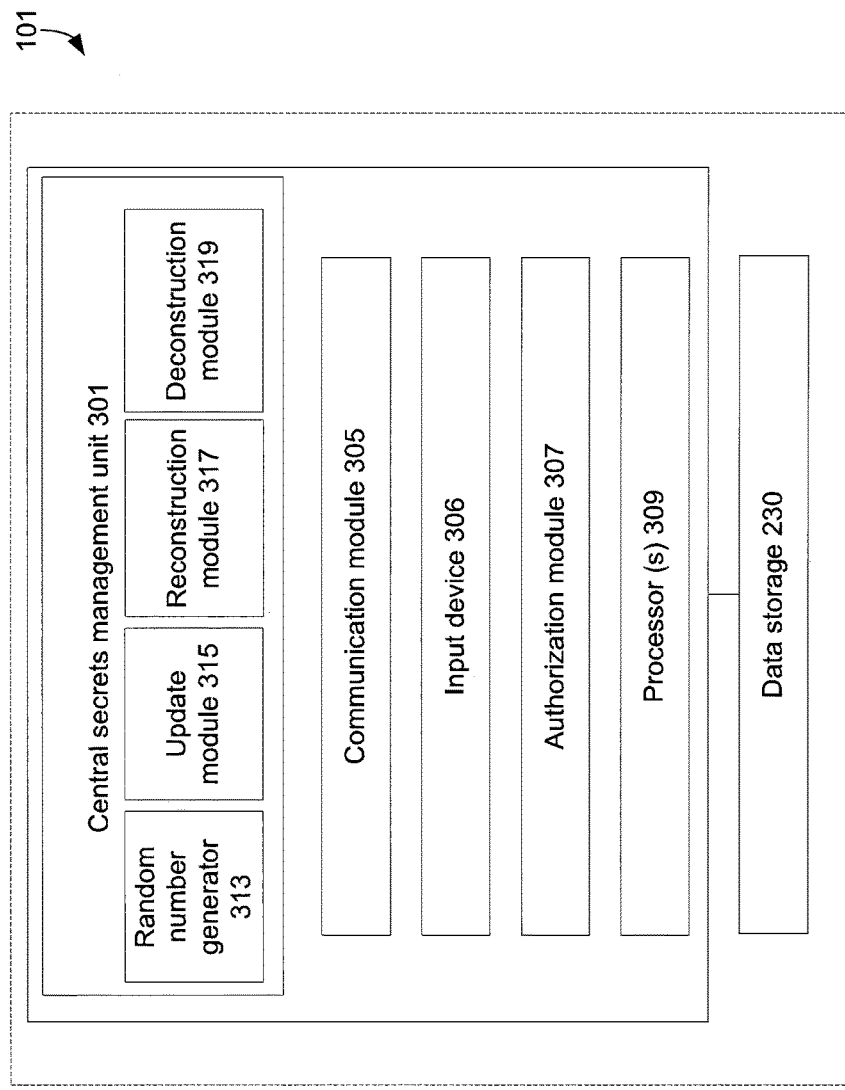
FIG. 3a is a functional block diagram of central authority management unit, in accordance with an example of the presently disclosed subject matter.

FIG. 3a illustrates a functional block diagram of central authority 101, in accordance with an example of the presently disclosed subject matter. Central authority 101 comprises for example: central secrets management unit 301, communication module 305, authorization module 307 and one or more computer processors 309. Central secrets management unit 301 can comprise or be otherwise operatively connected to: a reconstruction module 317 and a deconstruction module 319 random and number generator 313. Central secrets management unit 301 is configured to execute various secret management operations including for example, secret deconstruction, secret reconstruction, polynomial generation, etc.

Authorization module 307 is configured for authorizing the execution, and possibly also for executing, a restricted operation. Authorization of the restricted operation can be done in various ways. For example, authorization module 307 can be configured, responsive to successful reconstruction of the secret, to send the reconstructed secret to the device where the restricted operation is supposed to be executed. In another example, authorization module 307 can be configured, responsive to successful reconstruction of the secret, to send some type of command authorizing execution of the restricted operation to the device where the restricted operation is supposed to be executed. In yet another example, authorization module 307 can be configured, responsive to successful reconstruction of the secret, to generate and send a command (e.g. constituting a signal or digital data) instructing to execute the restricted operation.

Communication module 305 is configured for facilitating communication with central authority 101, e.g. between central authority and entities. Computer processor 309 is configured for controlling and executing operations described as described herein. According to some examples the processor can be configured to execute several functional modules (as described below with reference to FIGS. 4 to 8) in accordance with computer-readable instructions implemented on a non-transitory computer usable medium.

Central authority can further comprise or be otherwise operatively connected to input device 306 configured for receiving input data from a user. Input device 306 includes for example one or more of: mouse, keyboard, touch screen, touchpad, fingerprint reader, iris scanner, or any other input device.

Figure 3B:
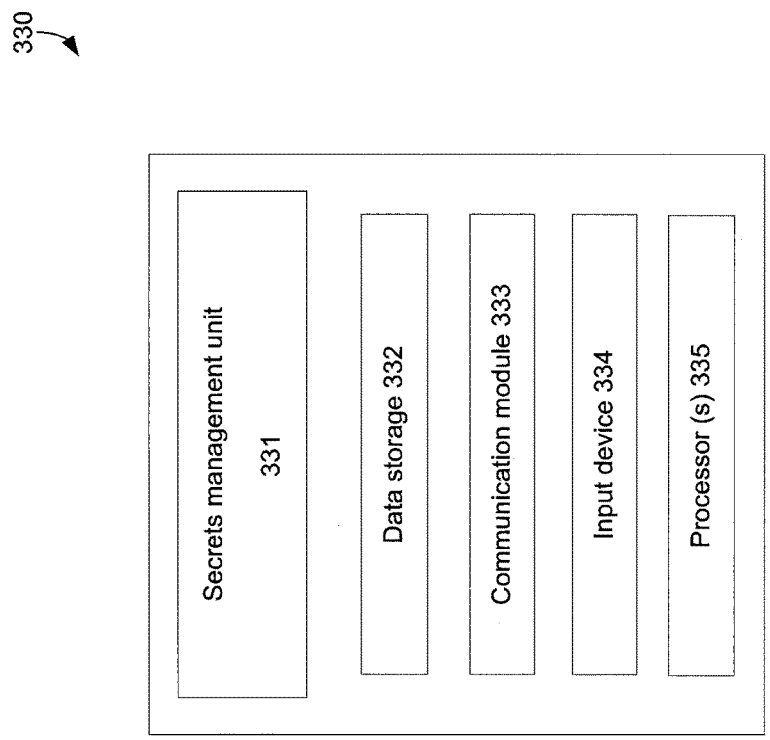
FIG. 3b is a functional block diagram of device management unit, in accordance with an example of the presently disclosed subject matter.

FIG. 3b shows a functional block diagram of an entity device 330, in accordance with an example of the presently disclosed subject matter. The term "entity device" includes any computerized device configured to operate autonomously or be operated by a person for interacting with central authority 101 (including a dedicated computerized device or a user computerized device as mentioned above) and a computerized device being controlled by central authority 101 (e.g. data storage devices $SD_{(1-n)}$ as described above with reference to FIG. 2).

Entity device 330 can comprise for example: secret management module 331; data storage 332; communication module 333; and one or more input devices 334. Secret management module 331 is configured in general to execute operations related to secret management including for example providing one or more identifiers to central authority 101. Communication module 333 is configured for enabling communication over a communication network including communication with central authority 101. Data storage 332 can be used for example for storing identifiers. Input device 334 (e.g. keyboard, mouse, mouse pad, etc.) can be used for receiving user input (e.g. instruction to send an identifier to central authority). Entity device 330 further comprises one or more computer processors 335 for controlling and executing operations. According to some examples the processor can be configured to execute several functional modules in accordance with computer-readable instructions implemented on a non-transitory computer usable medium.

Figure 4:
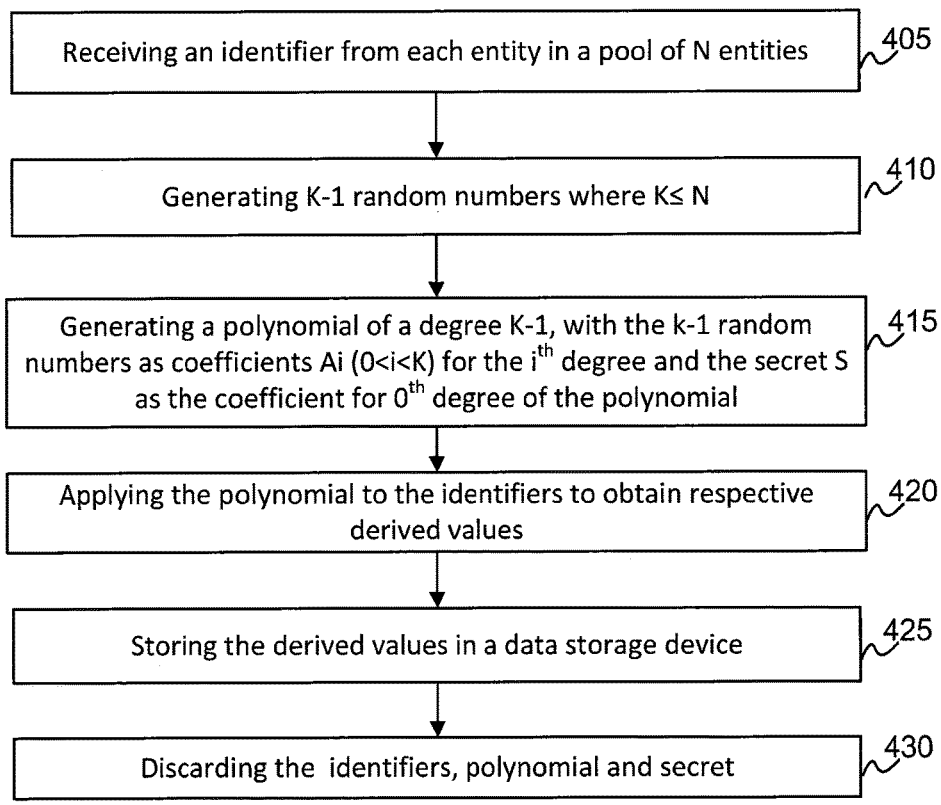
FIG. 4 is a flowchart showing an example of a sequence of operations related to secret deconstruction, in accordance with an example of the presently disclosed subject matter.

FIG. 4 is a flowchart showing a sequence of operations related to a secret deconstruction process, according to an example of the presently disclosed subject matter. Operations described with reference to FIG. 4 can be executed for example by central authority 101 (e.g. with the help of deconstruction module 319).

At block 405 central authority receives from each one of entities $104_{(1-n)}$ a unique identifier assigned to the entity. Identifiers can include any piece of information which uniquely identifies a respective entity. An identifier can be for example a password or a biometric identifier such as: fingerprint or any derivative thereof iris scan or any derivative thereof voice signature or any derivative thereof; DNA sequencing or any derivative thereof.

Notably, different entities in a single pool of entities can use different types of identifiers. For example, in case the entities are people communicating with a central authority via a computerized device, different people can choose a different type of identifier (e.g. some may provide a password while others may provide fingerprint or iris authentication data generated by an appropriate fingerprint reader or iris scanner).

The central authority ensures that all the submitted identifiers are indeed unique. If not, a request can be sent to one or more entities asking to provide a different identifier.

At block 410 K-1 random numbers are generated (e.g. with the help of random number generator 313). The random number can be for example a number between 1 and a very large prime number (e.g. $2^{256}-189$) for the purpose of assuring uniqueness of the generated number (e.g. all of the calculations are performed mod P where P is a very large prime number.)

At block 415 a polynomial function of degree K-1 is generated using the K-1 random numbers as coefficients $A_i$ ($0 \leq i \leq K$) for the $i^{th}$ degree and the secret S as the coefficient for $0^{th}$ degree of the polynomial.

The secret key can be generated for example by central authority 101 (e.g. by random number generator) or by an external source such as a remote device or user. Whenever the secret is available, the secret can be used for encrypting and/or locking an object. The object can be for example a device (e.g. data storage device, entrance door, weapon, safe, vehicle, etc.) or a piece of data (e.g. file or folder, etc.). After encryption, certain operations (referred to herein as "restricted operations") can be performed with respect to the encrypted object only if the secret is available and is used for decrypting and/or unlocking the object.

Notably, the entities are not necessarily equal to the encrypted/locked object. In some cases, the entities which provide the identifiers are also the objects which are encrypted or locked by the secret. This is so in the data-storage example, in case the identifiers are used for identifying the storage devices and the secret is used for restricting access to the same storage devices. In other cases, the entities which provide the identifiers are not the objects which are encrypted or locked by the secret. This is so in an entrance door example, where a quorum of K individuals is required for opening a door lock. The identifiers are used for identifying the individuals (the entities) and the secret is used for restricting access via the locked door (the object).

At block 420 the polynomial is applied to each one of the $X_i$ identifiers received from entities $104_{(1-n)}$ to provide a respective $f(X_i)$ values (i.e. derived value $Y_i$). The derived values are stored in data storage 230 (block 425). According to some examples, each derived value is stored together with information identifying the entity which provided the respective $X_i$ value (e.g. unique entity name).

At block 430 the received identifiers, the polynomial and secret S are discarded. Since only the derived values $Y_i$ are available at the central authority 101, the central authority is unable to reconstruct the secret and accordingly are unable to perform or authorize the restricted operation without first obtaining K $X_i$ values. The $Y_i$ values and the secret are not transmitted to entities $104_{(1-n)}$ and therefore each one of the entities, which has access only to its respective identifier, are unable to reconstruct the secret as well.

Notably, as it is not necessary to transmit secret shares from central authority 101 to entities $104_{(1-n)}$ a trusted (secure) communication link between central authority to entities $104_{(1-n)}$ for such data transmission is not necessary.

Figure 5:
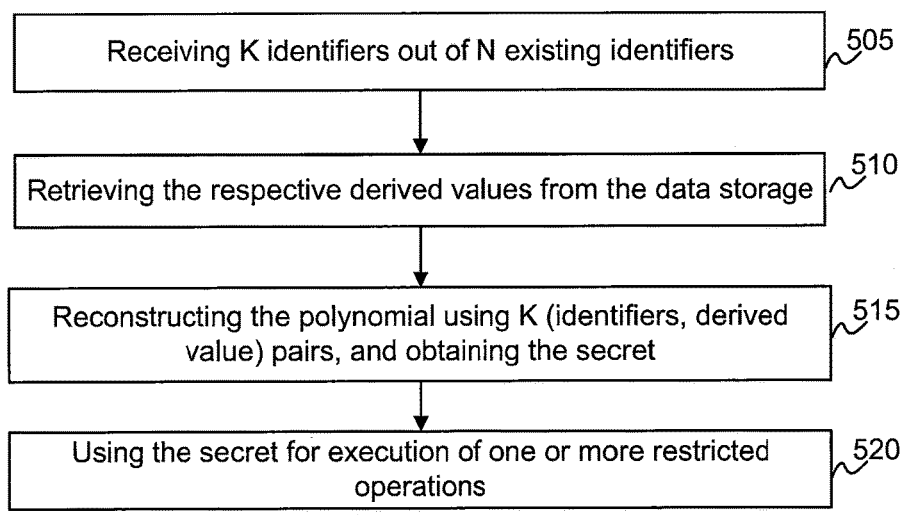
FIG. 5 is a flowchart showing an example of a sequence of operations related to secret deconstruction, in accordance with an example of the presently disclosed subject matter.

FIG. 5 shows a flowchart of a sequence of operations related to secret reconstruction, according to an example of the presently disclosed subject matter. Operations described with reference to FIG. 5 can be executed for example by central authority 101 (e.g. with the help of reconstruction module 317).

At block 505 central authority 101 receives from at least K entities out of entities $104_{(1-n)}$ their respective identifiers. Submission of the identifiers can occur for example in response to a request issued by the central authority or by another entity to execute a restricted operation.

At block 510 central authority 101 retrieves the derived values $Y_i$ from the data storage 230. Previously, it has been mentioned that each $Y_i$ value is stored together with data identifying a respective entity which provided the corresponding $X_i$ values. This information can now be used for matching the stored $Y_i$ values with their respective $X_i$ values retrieved from the entities.

At block 515 the polynomial is reconstructed using K (identifier, derived value) pairs (($X_i$, $Y_i$) bi-tuples). By reconstructing the polynomial, the value of the $0^{th}$ coefficient (i.e. secret S) is obtained. The reconstruction of the polynomial can be accomplished for example by implementing Lagrange Interpolation on the ($X_i$, $Y_i$) bi-tuples or by any other method for reconstructing polynomials which is known in the art.

Optionally, in case more than K identifiers of more than K entities are available, the polynomial and the respective secret can be reconstructed by applying the polynomial interpolation on different permutations of the available ($X_i$, $Y_i$) bi-tuples. This can assist in verifying that the obtained secret is indeed correct.

Once the secret is available, execution of the restricted operation is allowed (block 520). In response, central authority 101 can send a command authorizing the execution of a restricted operation and/or send a command directed for executing the restricted operation. As mentioned above, in some examples authorization module 307 in central authority 101 can be configured to govern final execution of the restricted operation.

For example, where central authority 101 is operating in a data-storage system as described above with reference to FIG. 2, central authority 101 (e.g. by authorization module 307) can be configured to distribute the reconstructed secret key to the storage devices allowing each data storage device to use the secret for decrypting the storage device and gain access to read and/or write the stored data. Likewise, central authority 101 can send a command to a weapon system for unlocking a weapon system and making it ready for activation.

According to another example, central authority can be configured, responsive to obtaining the secret, to send a command directed to actually execute the restricted operation. Examples of this include: sending a signal to a locking mechanism of an entrance door directed for unlocking the door; sending a signal to a weapon system for activating the weapon; sending a signal to safe lock for unlocking the safe; sending a command to data decoder for decoding an encryption and making a file or folder accessible.

Notably, the term "command" should be construed to include commands in different forms such as a signal (e.g. electric signal (voltage), optical signal, electromagnetic signal, etc.) or digital data transfer (e.g. one or more bits of data or a digital signature).

Figure 6:
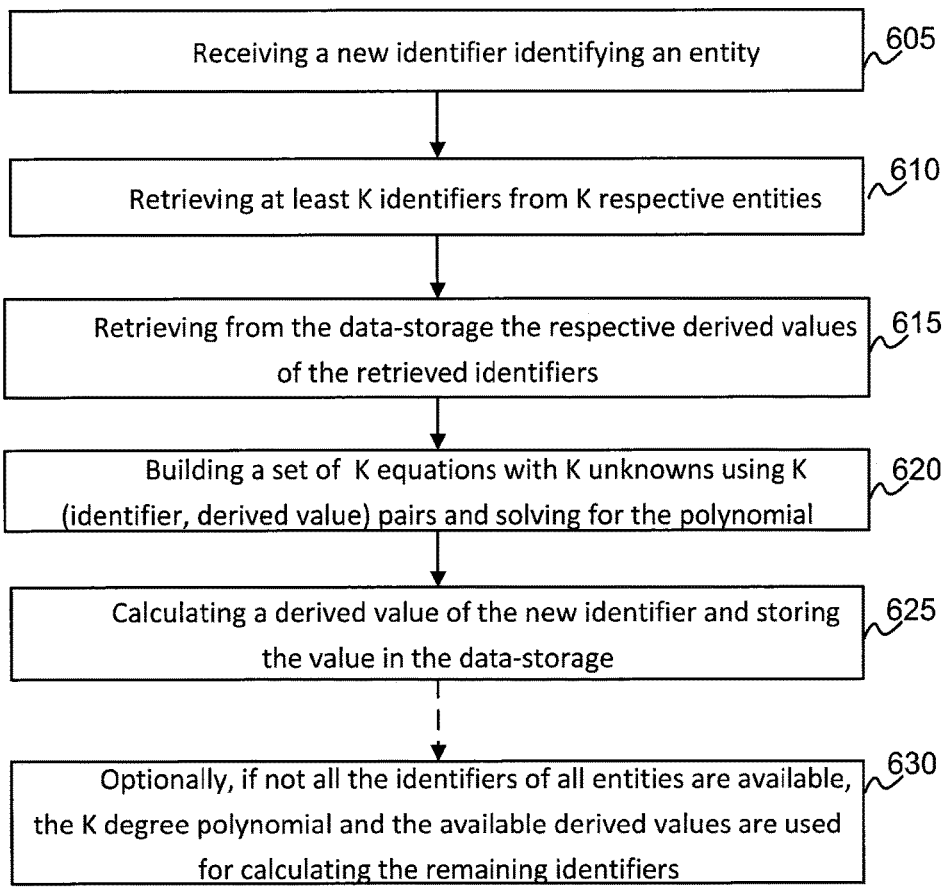
FIG. 6 is a flowchart showing an example of a sequence of operations related to adding a new entity, in accordance with an example of the presently disclosed subject matter.

Turning to FIG. 6, it shows a sequence of operations related to adding a new entity, according to an example of the presently disclosed subject matter. Operations described with reference to FIG. 6 can be executed for example by central authority 101 (e.g. with the help of update module 315).

In some cases an additional entity may be added to the pool of existing entities $104_{(1-n)}$. For example, this may occur when an additional storage device is added to a data-storage system. In such an event central authority 101 receives a respective unique identifier ($X_{N+1}$) submitted by the new entity (block 605).

At block 610, at least K identifiers $X_i$ of K respective entities are obtained by the central authority. The respective derived values $Y_i$ of the retrieved identifiers $X_i$ are obtained from data-storage 230 (block 615).

At block 620 the (identifier, derived value) pairs (($X_i$, $Y_i$) bi-tuples) are used in order to build a set of K equations with K unknowns, where the unknowns are the original $A_i$ coefficients and the new coefficients are the values of the $X_i$ raised to the $i^{th}$ power. At block 607 the K equations are solved and the $A_i$ coefficients are determined and the original polynomial is obtained.

Optionally, in case more than K identifiers of more than K entities are available, the operations described with respect to blocks 615 to 620 are repeated using different permutations of the assembled ($X_i$, $Y_i$) bi-tuples in order to verify that the correct result has been obtained.

Once the polynomial is available, a respective derived value (derived $Y_i$ value) is calculated for the new identifier ($X_{n+1}$) of the added entity (block 625). The new $Y_i$ value is stored in data-storage 230 and the identifiers and secret are discarded as explained above with reference to FIG. 4.

Optionally, in the event that not all the identifiers of all entities $104_{(1-n)}$ are available, the K degree polynomial and the available $Y_i$ values are used for calculating the remaining $X_i$ values (block 630). This operation can be executed in case it is desired to calculate new derived values $Y_i$ for additional, or possibly all, entities $104_{(1-n)}$, for example, in case it is desired to maintain a certain ratio between K and N and accordingly a new polynomial of a greater degree is calculated as described above with reference to FIG. 4.

Figure 7:
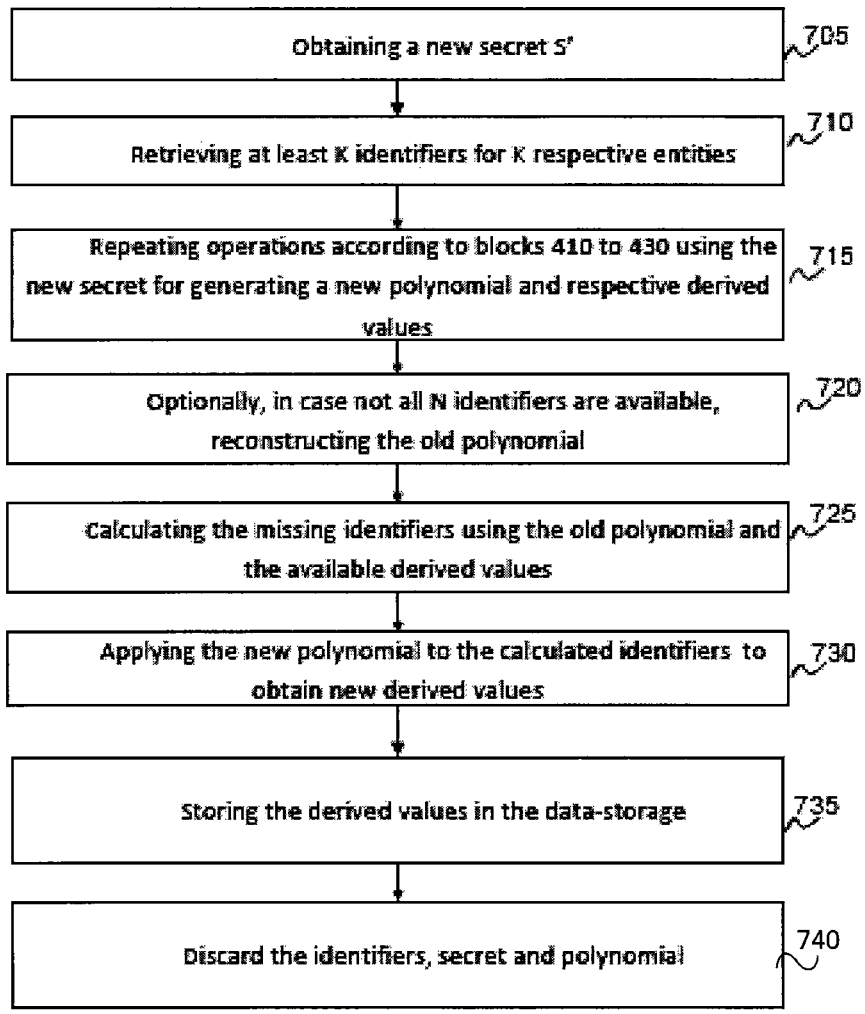
FIG. 7 is a flowchart showing an example of a sequence of operations related to changing secret S, in accordance with an example of the presently disclosed subject matter.
Figure 8:
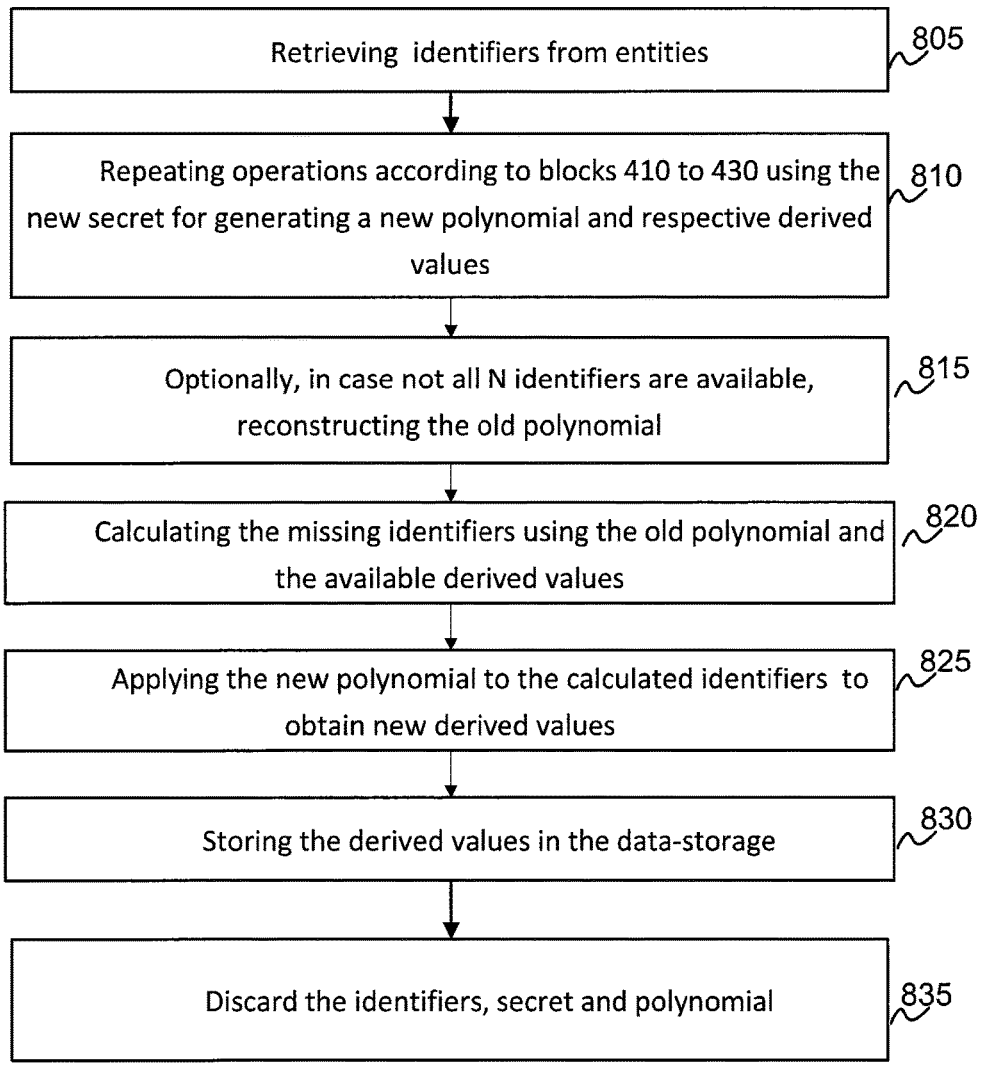
FIG. 8 is a flowchart showing an example of a sequence of operations related to removing an existing entity, in accordance with an example of the presently disclosed subject matter.

Turning to FIG. 7, it shows a flowchart of a sequence of operations related to changing secret S, according to an example of the presently disclosed subject matter. Operations described according to FIG. 7 can be carried out for example by central authority 101 (e.g. with the help of update module 315 in unit 301).

In some cases it may be desired to change a current secret S to a new secret S'. For example, a secret may be periodically changed in order to increase the system security.

At block 705 a new secret s' is obtained. For example, random number generator 313 can be configured to generate a new secret key or a new secret can be obtained from an external source. At block 710, central authority 101 receives from at least K entities out of entities $104_{(1-n)}$ their respective identifiers.

Assuming K or more (i.e. K+M identifiers, where M≥0) identifiers are retrieved, the operations described above with reference to blocks 410 to 430 are repeated using the new secret for generating a new polynomial and respective derived values (block 715).

In the event that not all the identifiers of all entities $104_{(1-n)}$ are available (K+M<N) and it is desired to provide derived values also to the entities whose identifiers are not available (non-participating entities), the respective derived values $Y_i$ of the retrieved identifiers $X_i$ are obtained from data-storage 230 and the old K−1 degree polynomial is reconstructed as described above with reference to FIG. 5 (block 720). The old polynomial and the available $Y_i$ values are used for calculating the remaining $X_i$ values (block 725). The new polynomial is applied to the calculated identifiers $X_i$ to obtain respective $Y_i$ derived values (block 730). The calculated $Y_i$ can be stored in data-storage 230 (block 735) and the identifiers, polynomial and secret are discarded (block 740) as explained above with reference to FIG. 4.

Optionally, in case more than K identifiers of more than K entities are available, the operations described with respect to block 715 are repeated using different permutations of the assembled ($X_i$, $Y_i$) bi-tuples in order to verify that the correct result has been obtained.

In some environments, the ability of the central authority to reconstruct the $X_i$ values of the non-participating entities may be considered to be a security risk as it would mean that compromising the central authority of one secret leads to the leakage of the $X_i$ values and usage of them in order to fraudulently reconstruct other secrets. In such an environment, each entity may have more than one identifier, each identifier assigned to a different secret. In this type of environment, central authority 101 is configured to manage multiple secrets and store for each secret respective derived values. Likewise, each entity device can be configured to manage multiple identifiers and use the proper identifier with the appropriate secret.

As explained above, the principles of the presently disclosed subject matter can be implemented in a data-storage system for encrypting the storage devices and allowing access to the storage devices only with an appropriate encryption key (secret). Assuming the data-storage system comprises N storage devices (drives) that can be locked and/or encrypted by the use of a key, each storage device is assigned with a respective unique identifier. According to one example, the identifier can be assigned to the storage device during the manufacturing stage. Alternatively, each storage device can be configured to generate a unique identifier. For example, secret management unit 331 can comprise a random number generator configured to generate a random number uniquely identifying the respective device.

The generated identifier can be written to a dedicated area of the storage space in each storage device. For example, in the SCSI standards it is described as an application log. The dedicated area can be physically and/or logically separated from the remaining storage space in the device dedicated for storing data. Unlike the remaining storage space, it is not encrypted by the secret key.

During an encrypting phase, the operations described above with reference to FIG. 4 are executed. Likewise, during a decryption phase, the operations described above with reference to FIG. 5 are executed.

In addition to the above, the method and system disclosed herein enables the removal of an entity from an existing pool of entities. Assuming there is a group of N entities it may be desired to remove one of the entities (e.g. in case a data storage device is removed from a data-storage system, or in case an individual is no longer allowed to access a certain area or building) and accordingly also omit the respective identifier from the group of N identifiers. According to one example, the respective derived value $Y_i$ can be simply deleted from the data-storage. In such case, the identifier of the omitted entity cannot be used for reconstructing the polynomial and obtaining the secret and is therefore useless. Note, that this allows omitting an entity from the pool of entities while keeping the entity unaware of this operation.

In some cases, additional operations may be carried out during the process of omitting an entity, for example, in case it is desired to generate a new secret and polynomial or only a new polynomial. Turing to FIG. 8 it shows a flowchart of a sequence of operations related to removal of an entity, according to an example of the presently disclosed subject matter. Operations related to removal of an entity includes those described according to FIG. 8 can be carried out for example by central authority 101 (e.g. with the help of update module 315 in unit 301).

According to one example this can be done by retrieving the identifiers from all or part of the entities in the pool of entities, possibly aside from the entity which is being omitted (block 805).

Notably, whether or not the identifier of the omitted entity is retrieved, can depend on the specific circumstances. In some cases, it may be desired to retrieve the identifier of the omitted entity, e.g. in case other identifiers in the pool of identifiers are missing and the identifier of the omitted entity is required for the purpose of obtaining K identifiers for reconstructing the polynomial and calculating the missing identifiers as described above with reference to FIG. 7. In other cases, it may be desired to avoid retrieving the identifier of the omitted entity, e.g. in case it is desired to that the omitted entity remains unaware of the omission.

At block 810 operation described above with reference to block 410 to 430 are repeated. The new value of K (K') may vary depending on the specific circumstances. In any case, as the pool of N entities has been decremented by 1, K' equals or smaller than N−1, unless a different entity was added to replace the one which has been removed. Notably, in some cases the same secret can be used with a different polynomial possibly of a different degree.

Optionally, in case not all identifiers are available the old polynomial can be reconstructed using at least K identifiers (block 815). Calculate the missing identifiers using the old polynomial and the respective derived values (block 820). Apply the new polynomial to the new pool of identifiers (block 825) store the respective derived values in the data-storage (block 830) and discard the secret, polynomial and identifiers (block 835).

It is to be understood that the system according to the presently disclosed subject matter may be a suitably programmed computer. Likewise, the presently disclosed subject matter contemplates a non-transitory computer storage device being readable by a computer for executing the method of the presently disclosed subject matter. The presently disclosed subject matter further contemplates a computer-readable memory (transitory and non-transitory) tangibly embodying a program of instructions executable by the computer for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

What is claimed is:

1. A system comprising:
    a computerized device configured for authorizing execution of a restricted operation, wherein the restricted operation is authorized only if a secret key is available; the computerized device comprising at least one computer processor operatively connected to a computer data storage; the computer processor is configured for reconstructing the secret key to:
    receive at least K identifiers out of a group of N identifiers, each identifier uniquely identifying a respective entity and is received from the respective entity; retrieve from the computer data storage for each of the at least K identifiers a respective derived value to obtain K (identifiers, derived value) pairs;
    wherein the derived values are generated at the system and are the product of applying a polynomial of a degree K-1 to the identifiers, where the constant term $a_0$ of the polynomial is the secret key, and wherein the derived values are retained in the computer data storage after being generated and are not made accessible to the entities; and
    reconstruct the polynomial based on the K (identifiers, derived value) pairs; and render the secret key available for enabling execution of the restricted operation.

2. The system of claim 1 wherein the at least one computer processor is further configured for deconstructing the secret key to:
    receive the N identifiers; use the polynomial of degree K-1 for generating a respective derived value for each of N received identifiers;
    store the derived values in the data storage for future use during reconstruction of the secret key, and discard the identifiers to thereby separate between the identifiers and the derived values; and discard the polynomial and the secret.

3. The system of claim 1 wherein the at least one computer processor is further configured, responsive to obtaining the secret key to transmit the secret to one or more entities to enable the execution of the restricted operation by the entity.

4. The system of claim 1 wherein the at least one computer processor is configured, responsive to obtaining the secret key, to generate a command instructing to execute the restricted operation.

5. The system of claim 1 wherein an entity is a computerized device being capable of performing the restricted operation only if the secret key is available at the computerized device.

6. The system of claim 1 wherein an entity is a person.

7. The system of claim 6 further comprising an input device configured for receiving from each entity user input data including a respective identifier.

8. The system of claim 1 wherein the identifiers include a combination of identifiers of various types.

9. The system according to claim 1 wherein the at least one computer processor is further configured for adding a new entity to existing N entities, to:
    retrieve at least K identifiers from K respective entities; retrieve from the data-storage the respective derived values of the retrieved identifiers; use the at least K identifiers and respective derived values to reconstruct the polynomial; apply the polynomial to the new identifier, identify the new entity, and obtain a new derived value; and store the derived value in the data-storage.

10. The system according to claim 1 wherein the computer processor is further configured for changing the secret key, to:
    retrieve at least K identifiers from K respective entities; generate a new polynomial of a degree K-1, where the constant term $a_0$ of the polynomial is a new secret key; use the new polynomial for generating a respective derived value for each of the at least K identifiers;
    in the event that not all N identifiers are available, the at least one processor is configured to:
    retrieve from the computer data storage for each of the at least K identifiers a respective derived value to obtain at least K (identifiers, derived value) pairs; use K (identifiers, derived value) pairs to reconstruct the polynomial; use the derived values for calculating the remaining identifiers; apply the new polynomial to the calculated identifiers to obtain respective derived values; and store the derived values in the data-storage.

11. The system according to claim 1 wherein the entities being N data-storage devices constituting a physical storage space of a data-storage system; the computerized device is configured for managing at least one secret key for enabling execution of one or more restricted operations at the N storage devices.

12. A computer implemented method of authorizing execution of a restricted operation, wherein the restricted operation is authorized only if a secret key is available; the computer comprising at least one computer processor operatively connected to a computer data storage; the method comprising operating the computer processor for reconstructing the secret key, comprising:
    receiving at least K identifiers out of a group of N identifiers, each identifier uniquely identifying a respective entity and is received from a respective entity;
    retrieving from the computer data storage for each of the at least K identifiers a respective derived value to obtain K (identifiers, derived value) pairs; wherein the derived values are the product of applying a polynomial of a degree K-1 to the identifiers, where the constant term $a_0$ of the polynomial is the secret key, and wherein the derived values are retained in the computer data storage after being generated and are not made accessible to the entities; and reconstructing the polynomial based on the K (identifiers, derived value) pairs; and rendering the secret key available for enabling execution of the restricted operation by the computer or by another device.

13. The method of claim 12 further comprising using the at least one computer processor for deconstructing the secret key, comprising:

receiving the N identifiers; using the polynomial of degree K−1 for generating a respective derived value for each of N received identifiers;

storing the derived values in the data storage for future use during reconstruction of the secret key;

discarding the identifiers to thereby separate between the identifiers and the derived values; and discarding the polynomial and the secret.

14. The method of claim 12 wherein an entity is a computerized device being capable of performing the restricted operation only if the secret key is available at the computerized device, the method further comprising, responsive to obtaining the secret key, transmitting the secret to one or more entities to enable the execution of the restricted operation by the entity.

15. The method of claim 12 further comprising, responsive to obtaining the secret key, generating a command instructing to execute the restricted operation.

16. The method according to claim 12 further comprising using the at least one computer processor, responsive to receiving a request to add a new entity to existing N entities, for:

retrieving at least K identifiers from K respective entities;
retrieving from the data-storage the respective derived values of the retrieved identifiers;
using the at least K identifiers and respective derived values to reconstruct the polynomial;
applying the polynomial to the new identifier, identifying the new entity, and obtaining a new derived value; and
storing the derived value in the data-storage.

17. The method of claim 12 further comprising using the at least computer processor for changing the secret key, comprising:

retrieving at least K identifiers from K respective entities;
generating a new polynomial of a degree K−1, where the constant term $a_0$ of the polynomial is a new secret key; using the new polynomial for generating a respective derived value for each of the at least K identifiers;
in the event that not all N identifiers are available:
retrieving from the computer data storage for each of the at least K identifiers a respective derived value to obtain at least K (identifiers, derived value) pairs; using K (identifiers, derived value) pairs to reconstruct the polynomial; using the derived values for calculating the remaining identifiers; applying the new polynomial to the calculated identifiers to obtain respective derived values; and storing the derived values in the data-storage.

18. The method according to claim 12, wherein the computer is a control device in a data-storage system, the entities being N data-storage devices constituting a physical storage space of the data-storage system; the method comprising managing at least one secret key for enabling execution of one or more restricted operations at the N storage devices.

19. A data-storage system comprising:

a control layer comprising one or more control devices operatively connected to N data-storage devices, the data-storage devices constituting a physical storage space of the data-storage system; wherein at least one of the control devices is configured for managing at least one secret key required for enabling execution of one or more restricted operations at the N storage devices; the at least one control device comprising at least one computer processor operatively connected to a computer data storage; the computer processor is configured for reconstructing the secret key to:

receive at least K identifiers out of a group of N identifiers, each identifier uniquely identifying a respective data-storage device and is received from a respective data-storage device; retrieve from the computer data storage for each of the at least K identifiers a respective derived value to obtain K (identifiers, derived value) pairs;

wherein the derived values are generated at the system and are the product of applying a polynomial of a degree K−1 to the identifiers, where the constant term $a_0$ of the polynomial is the secret key, and wherein the derived values are retained in the computer data storage after being generated and are not made accessible to the data storage devices; and reconstruct the polynomial based on the K (identifiers, derived value) pairs and render the secret key available for enabling execution of the restricted operation.

20. The data-storage system of claim 19 wherein the at least one processor is further configured to transmit the secret to one or more data-storage devices, to enable the storage devices to execute I/O operations on stored data.

21. The data-storage system of claim 19 wherein the computer processor is further configured for deconstructing the secret key to:

receive the N identifiers from the N storage-devices; use the polynomial of degree K−1 for generating a respective derived value for each of N received identifiers; store the derived values in the data storage for future use during reconstruction of the secret key, and discard the identifiers to thereby separate between the identifiers and the derived values; and discard the polynomial and the secret.

22. A non-transitory program storage device readable by a computer, tangibly embodying computer readable instructions executable by the computer to perform a method of authorizing execution of a restricted operation, wherein the restricted operation is authorized only if a secret key is available; the computer comprising at least one computer processor operatively connected to a computer data storage; the method comprising operating the computer processor for reconstructing the secret key, comprising:

receiving at least K identifiers out of a group of N identifiers, each identifier uniquely identifying a respective entity;

retrieving from the computer data storage for each of the at least K identifiers a respective derived value to obtain K (identifiers, derived value) pairs; wherein the derived values are the product of applying a polynomial of a degree K−1 to the identifiers, where the constant term $a_0$ of the polynomial is the secret key, and wherein the derived values are retained in the computer data storage after being generated and are not made accessible to the entities;

reconstructing the polynomial based on the K (identifiers, derived value) pairs; and rendering the secret key available for enabling execution of the restricted operation by the computer or by another device.

\* \* \* \* \*